United States Patent
Black et al.

(10) Patent No.: US 9,147,172 B2
(45) Date of Patent: Sep. 29, 2015

(54) SOURCE CONFIGURATION BASED ON CONNECTION PROFILE

(75) Inventors: Chuck A. Black, Rocklin, CA (US); Lin A. Nease, Granite Bay, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1748 days.

(21) Appl. No.: 12/359,547

(22) Filed: Jan. 26, 2009

(65) Prior Publication Data
US 2010/0191852 A1    Jul. 29, 2010

(51) Int. Cl.
*G06F 15/173* (2006.01)
*G06F 15/16* (2006.01)
*G06Q 10/06* (2012.01)
*H04L 29/08* (2006.01)

(52) U.S. Cl.
CPC .............. *G06Q 10/06* (2013.01); *H04L 67/141* (2013.01); *H04L 67/30* (2013.01)

(58) Field of Classification Search
CPC ....... G06Q 10/06; H04L 67/30; H04L 67/141
USPC .......................... 709/225, 223, 226, 227, 228
See application file for complete search history.

(56) References Cited

U.S. PATENT DOCUMENTS

| | | | |
|---|---|---|---|
| 6,094,687 A * | 7/2000 | Drake et al. ................... | 709/241 |
| 2002/0027906 A1 * | 3/2002 | Athreya et al. ................ | 370/386 |
| 2008/0005285 A1 * | 1/2008 | Robinson et al. ............. | 709/220 |
| 2008/0275992 A1 * | 11/2008 | Basty et al. ................... | 709/227 |

\* cited by examiner

*Primary Examiner* — Joseph E Avellino
*Assistant Examiner* — James Conaway
(74) *Attorney, Agent, or Firm* — Mannava & Kang, P.C.

(57) ABSTRACT

Connection profiles are created and stored. The connection profiles are for connections for sources to connect to a network. The connection profiles identify network attributes and server attributes for the connections and each connection profile includes a status of available or subscribed. A connection profile is assigned to a requested connection for a source. The source is authenticated using a credential, and server attributes from the connection profile are sent to the source to configure the source to use the connection.

14 Claims, 5 Drawing Sheets

SOURCE CONFIGURATION BASED ON CONNECTION PROFILE

CROSS-REFERENCE TO RELATED APPLICATIONS

The present application is related to U.S. patent application Ser. No. 12/359,544, filed on Jan. 26, 2009, entitled "Network Connection Management Using Connection Profiles" by Black et al., and U.S. patent application Ser. No. 12/359,536, filed on Jan. 26, 2009, entitled "Network Edge Switch Configuration Based On Connection Profile" by Black et al., both of which are incorporated herein by reference in their entireties.

BACKGROUND

Many datacenters today consist of large numbers of servers connected to large numbers of networks. The tasks of allocating, provisioning, and maintaining server-to-network connections, switches, and servers is difficult and often inefficient.

In many instances, especially with respect to large data centers or with respect to organizations with a large information technology (IT) group, there may be one group of network administrators for managing the network, and one group of server administrators for managing the servers and the applications running on the servers. Allocating, provisioning, and maintaining server-to-network connections is typically an ad hoc process which requires communication between both groups of administrators. For example, a trouble ticket is passed between the server administrator and the network administrator in order to arrive at an agreement about when, where, and how to configure and plug in a server into a network, and how the network should be configured, and how other network devices such as firewalls and load balancers should be changed in order to accommodate the new, or changed, server. This process is cumbersome and prone to error and misunderstandings, and can often lead to misconfigurations, loss of connectivity, and possibly to network outages. Also, there is not much management or accountability in this process. As a result, allocating, provisioning, and maintaining server-to-network connections becomes difficult, and inefficient, and creates a greater risk of network failures.

Similarly, configuration of a source, such as a server, requires cooperation between the network and server administrator. The server is usually manually configured through cooperation between the network and server administrator to determine and set attributes in the server. As a result, configuration of the server becomes inefficient, and creates a greater risk of failures due to communication errors or merely the mistyping of values.

BRIEF DESCRIPTION OF DRAWINGS

The embodiments of the invention will be described in detail in the following description with reference to the following figures.

DETAILED DESCRIPTION OF EMBODIMENTS

Figure 1:
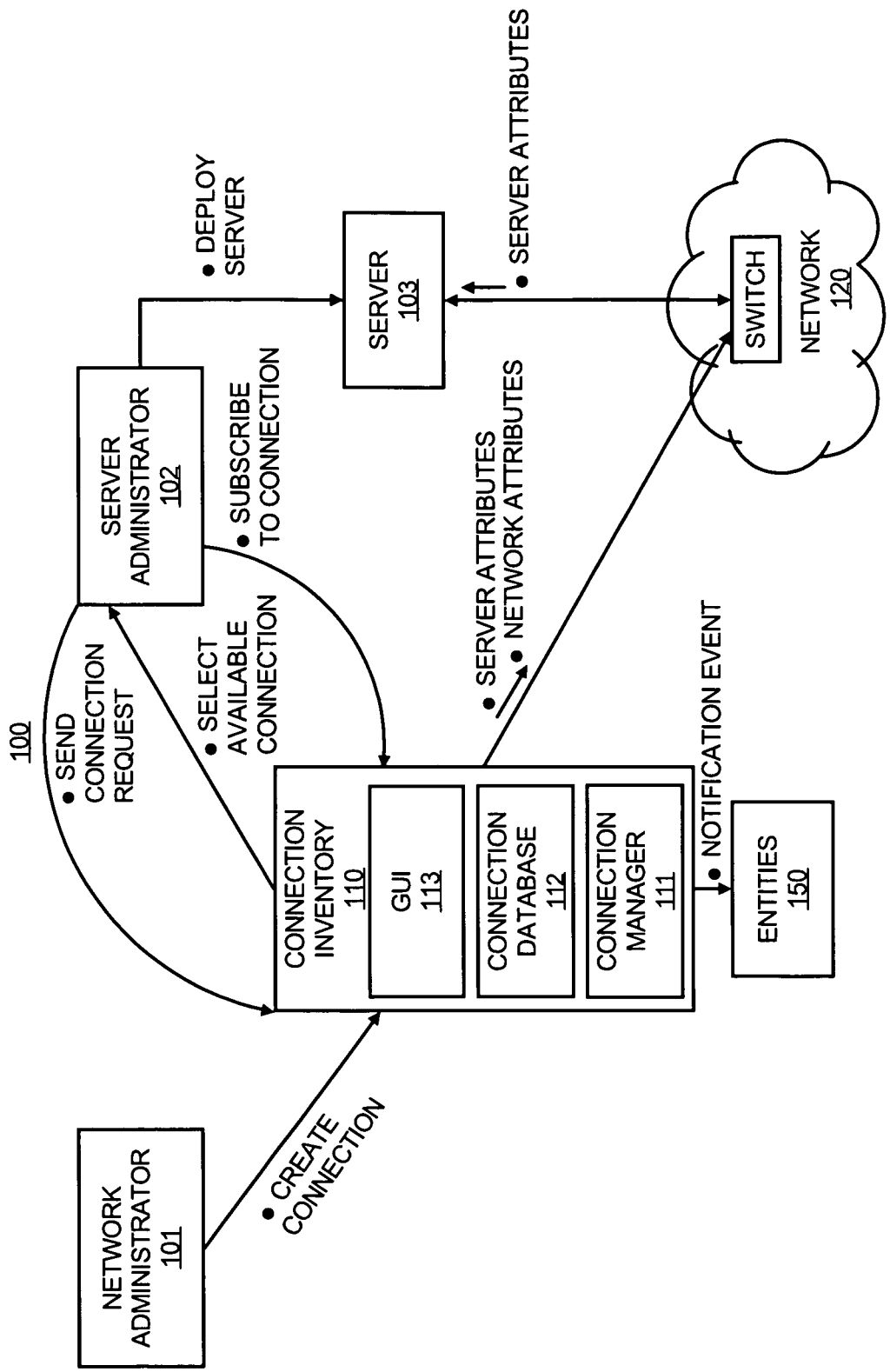
FIG. 1 illustrates a system, according to an embodiment.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

According to an embodiment, an edge switch is configured based on a selected connection profile and configuration values stored in a connection inventory and provided to the edge switch from the connection inventory. An edge switch is a network switch that is an entry point to a core network. A core network may be a service provider network or an enterprise network. In a data center, servers may be connected on smaller networks, such as local area networks (LANs). The multiple LANs are connected by an enterprise network, which may provide high-speed communication between LANs or a gateway to the Internet. The process begins when a network administrator creates connection profiles for connections and stores the connection profiles in the connection inventory. A connection is a network connection for a source. The connection provides the source with a connection to the network and to devices connected to the network. The source may be a network device, such as a computer system or network interface. In one embodiment, the source is a network interface, such as a network interface card (NIC) or virtual NIC (VNIC) for a virtual machine. The connection includes a recognized unique ID, such as a media access control (MAC) address, for the NIC or VNIC. For example, a computer system, such as a server, may have 2 NICs and 4 VNICs, each with its own unique address. Each of the NICs and virtual machines has a connection. In another example, a personal computer (PC) may have two NICs, one for wired and one for wireless. Each has its own MAC address and connection. A network switch, which is a network device that connects network segments (e.g., a router, bridge, hub, repeater, etc.), receives traffic having a recognized MAC address and forwards the traffic on a network segment toward a destination. If a MAC address is not recognized, the packet may be dropped, and thus no connection is available for that MAC address.

After connection profiles are created, at some later point in time, the server administrator needs a connection for a server and consults the connection inventory. The process of selecting a connection which meets the needs of the server results in an association being made between the server and the connection profile for the connection. Once this step is accomplished, the server may be connected anywhere in the network, and a network edge switch for the server is automatically configured for network attributes through the connection inventory.

The connection inventory includes a connection manager configured to create the connections for sources. Creating a connection includes storing a connection profile in a connection database, and representing that a connection is available for use. The connection profile includes network attributes about the connection, and a hierarchy of information, such as a pod and a connection class. A network administrator may make determinations, such as whether resources are available to support a new connection, before creating the connection. Once the connection is created and is thus made available for use, the connection may be subscribed through a matching process in response to a connection request. Once subscribed, the connection is reserved and cannot be used by other sources. The source and a switch, such as an edge switch which provides entry into an enterprise or service provider network, are then configured for the connection, and the connection is used for the source's network traffic.

The connection manager makes managing connections easier by creating connections based on pre-defined connection classes, and allowing server administrators to subscribe to available connections, instead of having to go back and forth with a network administrator to create and make available a network connection. As a result, networking functionality is made more reliable, more robust, and easier to manage for network and server administrators alike.

FIG. 1 illustrates a system 100, according to an embodiment. The system 100, in addition to showing the components of the system 100, describes functionality performed by the components for deploying a new server 103. The system 100 includes a network administrator 101 and a server administrator 102, both of which may include computer systems for the administrators to perform the functions described herein. The system 100 also includes a connection inventory 110 including a connection manager 111, a connection database 112 storing connection profiles and other information, and a graphic user interface (GUI) 113.

The server administrator 102 needs to deploy a new server, shown as server 103, in a data center. A network connection is needed to connect the server 103 to a network 120 in the data center. The server administrator 102 requests a network connection for the server 103. The request may specify the connection class for the connection, which includes the network attributes needed for the connection. The connection request may be sent to the connection inventory 110. In one example, the network and server administrators 101 and 102 use the GUI 113 to interact with the connection inventory 110. For example, the server administrator 102 uses the GUI 113 to log into the connection inventory 110 and send the connection request to the connection inventory 110. Although not shown, the server administrator 102 may alternatively send the connection request to the network administrator 101.

The network administrator 101 creates connection profiles for connections. Creating a connection profile includes storing the connection profiles in the connection database 112. For example, the network administrator 101 uses the GUI 113 to log into the connection inventory 110 and store the connection profiles in the connection database 112.

In response to the connection request from the server administrator 102, the connection manager 111 determines whether any connection profiles are stored in the connection database 112 that match the connection request and are available. Information in the connection profiles, such as connection class, network attributes, etc., is used to match a connection profile with the requested connection. If a match is found, the connection manager selects the available connection profile and sends an indication of the selection to the server administrator 102. The server administrator 102 then sends an indication to subscribe to the selected connection. The connection manager 111 then changes the status of the connection profile for the connection from available to subscribed. The selected connection profile is then reserved (i.e., subscribed) and cannot be used for any other sources.

After the connection profile is subscribed and thus is assigned to the connection for the server 103, the server 103 is authenticated as a network device that is authorized to access and send traffic on the network 120. Remote Authentication Dial In User Service (RADIUS) is a networking protocol that may be used to authorize connection to a network.

Also, after the connection profile is subscribed, an edge switch 130 is configured for the connection for the server 103. This may include sending layer 2 network attributes to the edge switch 130 to configure the edge switch 130 to recognize and allow traffic to and from the server 103 on the network 120. The network attributes are identified by the connection manager 111 from the connection profile assigned to the connection for the server 103. The connection manager 111 sends the network attributes from the connection profile to the edge switch 130. The edge switch 130 stores the network attributes and configures the switch with the attributes. The edge switch 120 also stores a MAC address for a NIC in the server 103. The server 103 may then use the connection, shown as subscribed connection 130, to send and receive packets to and from the network 120. The connection manager 111 may send notification events to entities 150, indicating a change of a connection status (e.g., available or subscribed). The entities 150 may include the network administrator 101, the server administrator 102, management applications for managing the network, or other entities.

Figure 2:
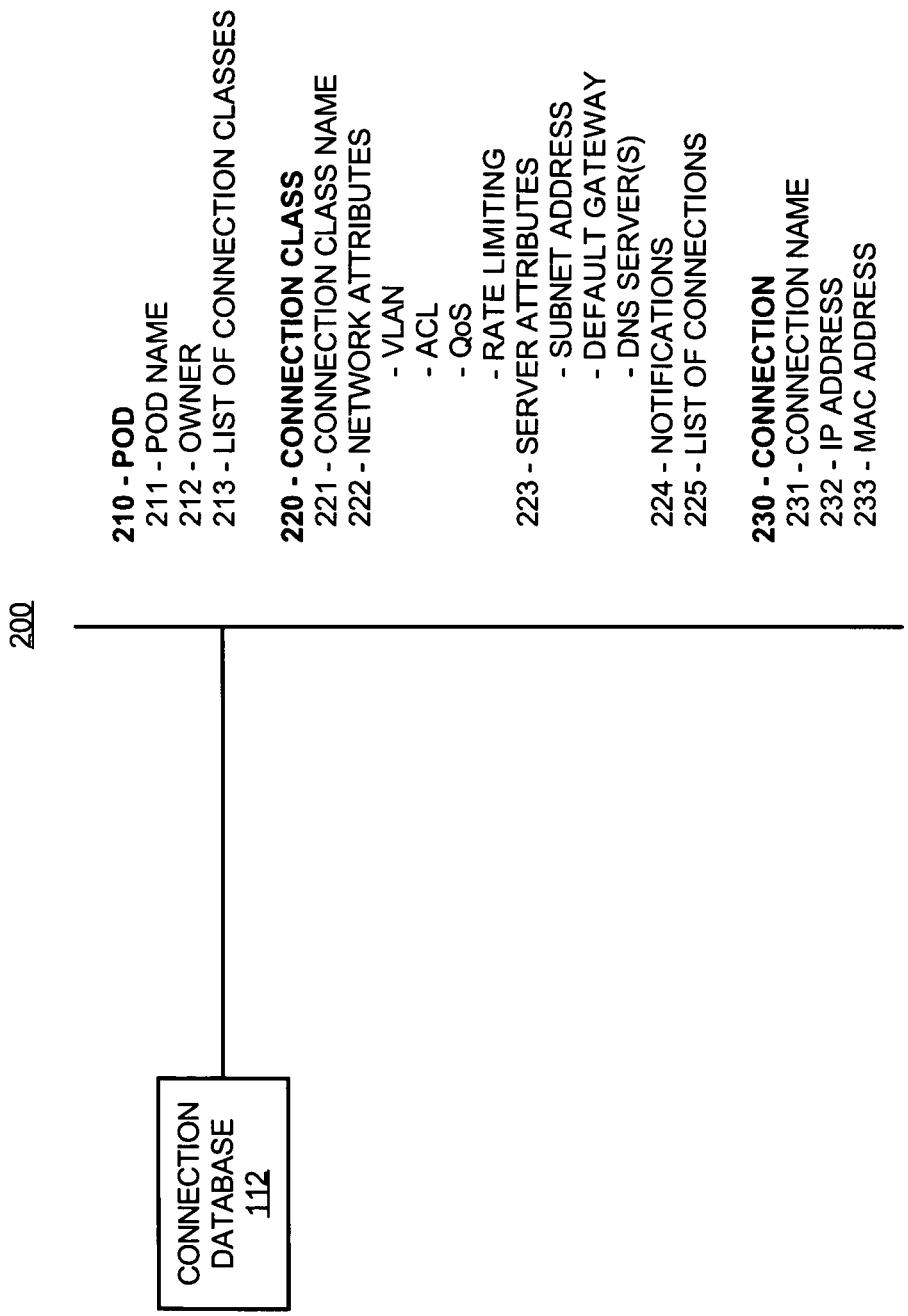
FIG. 2 illustrates a data model for a connection profile, according to an embodiment.

The connection profiles may include a hierarchy of information for each connection. FIG. 2 shows the connection database 112, and a data model 200 of a hierarchy of information stored in each connection profile, according to an embodiment. The data model 200 includes a pod 210 and a connection class 220. A pod is a physically and logically distinct set of networking devices, including core, distribution and edge networking devices, and servers. For example, a data center may support different companies, and servers and networking devices for company A are in one pod and servers and networking devices for company B are in another pod. The pod 210 includes a pod-name 211, an owner 212, and a list of connection classes 213.

The connection class defines the attributes of the network specific to that class of connection. The connection class includes a name 221, network attributes 222, server attributes 223, notifications 224 and a list of connections 225 for that connection class. The network attributes 222 include but are not limited to VLAN, access control list (ACL), quality of service (QoS), and rate-limit. In one example, a datacenter may have a three-tiered structure (e.g., an external layer for sending/receiving traffic to/from the Internet, an application layer, and a database layer), and each layer may have one or more connection classes. A database connection class has network attributes specific to that layer, and so on for each of the other layers.

VLAN is generally equivalent to an Internet Protocol (IP) subnet and identifies a domain for the connection class. Typically there is a range of IP values assigned to each subnet. In a datacenter with the three-tiered structure described above, each layer may have its own VLAN. Traffic that does not belong to the VLAN is not accepted into the VLAN.

An ACL is used to filter traffic for the VLAN. For example, if a VLAN is created for an accounting department, the ACL is used to only allow packets for the accounting VLAN to enter the VLAN. The ACL identifies the traffic authorized for the VLAN. The ACL may identify ports for routing that restrict traffic into the VLAN.

QoS is associated with routing packets in the network and can be used to specify an appropriate location in a queue in a switch for packets. For example, a voice-over-IP (VoIP) packet may have a high QoS, because VoIP applications cannot tolerate significant delay. Thus, VoIP packets may have a higher QoS than another type of data packet, and the VoIP may be put ahead of other packets in the VLAN.

Rate-limiting can be used to determine when packets are dropped. If the rate of traffic received in a buffer in a switch exceeds a threshold, then packets are dropped.

The server attributes 223 specify the attributes for the server being configured. Examples of server attributes include subnet address, default gateway, and DNS sever(s) for the class.

The notifications 224 identify whether an entity, such as one or more of the entities 150 shown in FIG. 1, are sent notifications in response to a status change of a connection for the class stored in the connection database 112. The notifications 224 also identify which entities receive the notifications of status changes. The list of connections 225 (i.e., connection profiles) stored in the connection database 112 for the class may also be stored.

The connection 230 is an instance of a connection in the connection class, and inherits the attributes of the connection class 220, such as the attributes 222, 223, and the notifications 224. The list of connections 225 list all the instances of the connections, for example by name. The connection 230 includes a connection name 231, an IP address 232, and a MAC address 233. The IP address is the address of the source, and the MAC address is the address of the NIC in the source.

Figure 3:
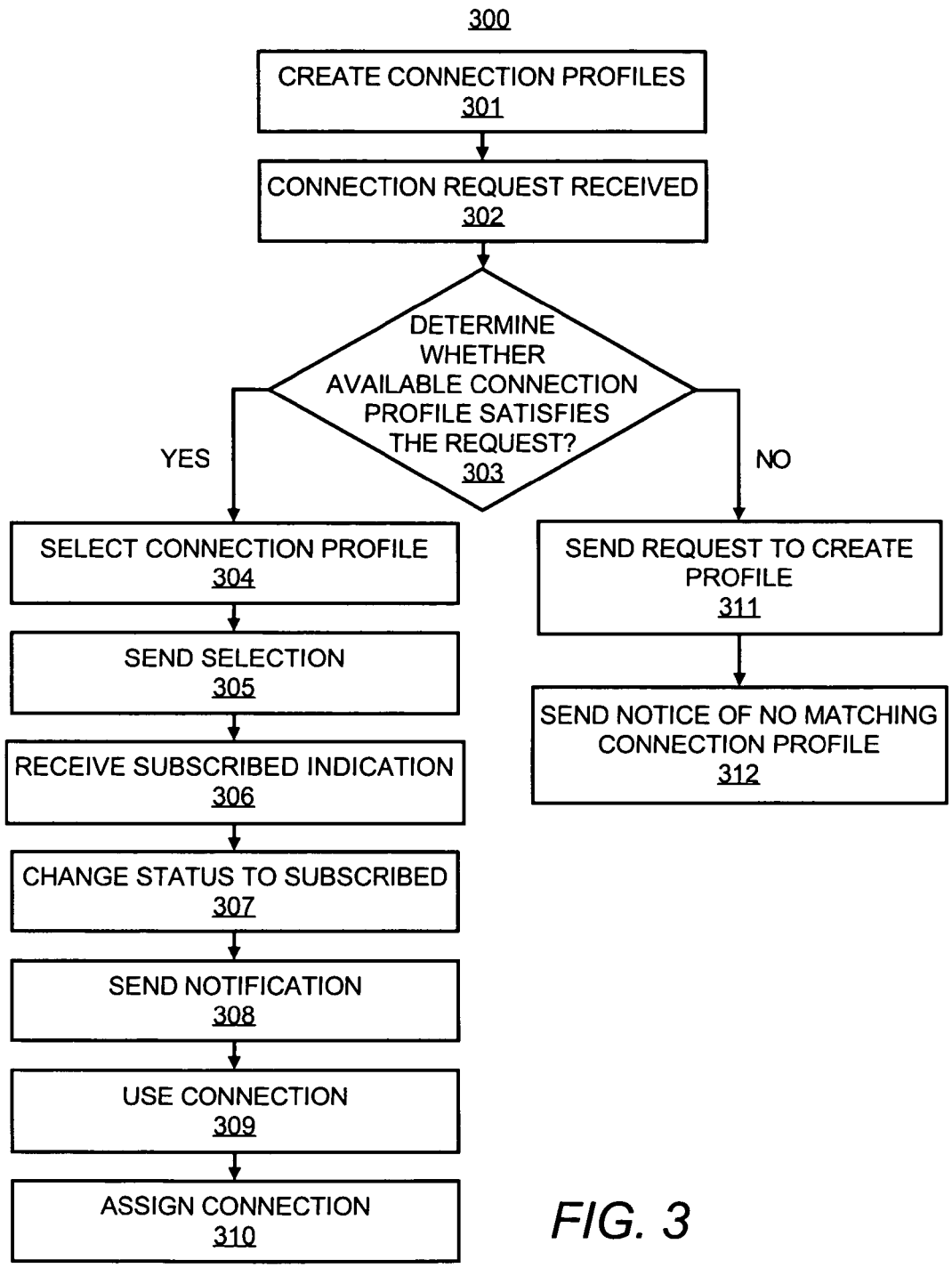
FIG. 3 illustrates a method for managing connection profiles, according to an embodiment.

FIG. 3 illustrates a method 300 for managing network connections, according to an embodiment. The method 300 is described with respect to FIGS. 1 and 2 by way of example and not limitation. It should be noted that one or more of the steps of the method 300 may be performed in different orders.

At step 301, connection profiles are created. For example, the system administrator 101 in FIG. 1 stores connection profiles in the connection database 112. The profiles include the features of the data model 200 shown in FIG. 2. For example, each connection profile specifies a pod and a connection class. A connection profile for a connection in a connection class has all the attributes of the connection class. Pods and connection classes may also be created by network administrator 101 as needed.

Also, each connection profile includes a status of available or subscribed. When a connection is created, it is available until it is subscribed and is eventually used by a source to send and receive network traffic.

At step 302, a connection request is received. For example, the server administrator sends a connection request to the connection inventory 110, because a connection is needed for the server 103. The connection request may specify a pod and connection class or other attributes for the requested connection, so a determination can be made as to whether an available connection profile is stored in the connection database 112 that satisfies the request.

At step 303, the connection manager 111 determines whether an available connection profile is stored in the connection database 112 that satisfies the request. For example, the connection manager 111 queries the connection database 112 using a pod and connection class specified in the request.

At step 304, if a connection profile is available that satisfies the request, the connection manager 111 selects the connection profile.

At step 305, an indication of an available connection satisfying the request is sent to the server administrator 102. If multiple available connection profiles satisfying the request are found, one connection profile is selected either by the connection manager 111 or the server administrator 102.

At step 306, an indication that the selected connection profile is subscribed is received at the connection manager 111. For example, the server administrator 102 determines that the connection profile is appropriate for the server 103, and subscribes to the connection for that connection profile by sending an indication to subscribe to the connection profile to the connection manager 111. In some instances, the server administrator 102 may determine that the selected connection profile is not what is needed for the server 103 or no response to the indication from step 305 is received at the connection manager 111 within a predetermined period of time (i.e., a timeout is reached). In these instances, the selected connection profile remains available and is not subscribed.

At step 307, the status of the selected connection profile is changed from available to subscribed. Now the connection for the connection profile is reserved for the request.

At step 308, a notification of the status change is sent to designated entities for the connection class, such as a particular server administrator and network administrator.

At step 309, the connection for the subscribed connection profile is used after configuring the server to use the connection. This may include configuring the IP address of the server and configuring an edge switch for the server to accept traffic for the server on the connection.

At step 310, the connection for the matching connection profile is assigned to the source. This includes storing an instance of the connection for the connection class in the connection database 112. The instance may specify the connection name, and IP and MAC address of the source and NIC for the connection.

If an available connection profile that satisfies the connection request is not stored in the connection database 112 as determined at step 303, then the connection manager 111 sends a request to the network administrator 101 to create a profile for the requested connection at step 311. Also, at step 312, a notice is sent to the requestor, such as the server administrator 102, that no available connections that satisfy the request currently exist but a request to create a connection profile for the requested connection has been sent to the network administrator 101.

Figure 4:
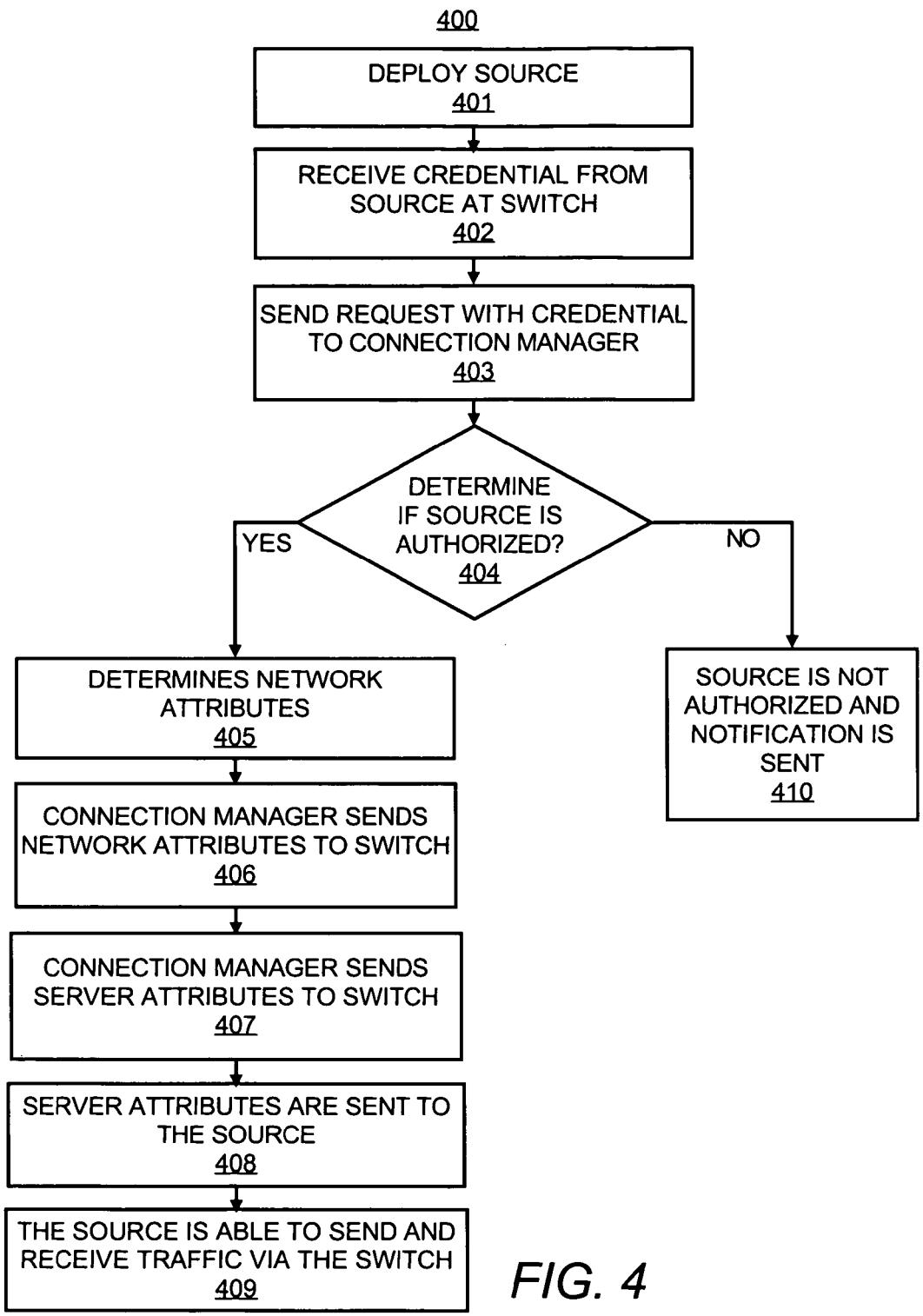
FIG. 4 illustrates a method for authenticating a source, according to an embodiment.

FIG. 4 illustrates a method of authenticating the source to use a subscribed connection, according to an embodiment. The method 400 is described with respect to FIGS. 1-3 by way of example and not limitation.

The method 300 describes steps for subscribing to a connection profile for a requested connection and assigning the connection profile to the source for the requested connection in steps 309 and 310 and steps prior to 309 and 310. After the connection profile is subscribed, the source is configured and deployed at step 401. For example, the server 103 is deployed by the server administrator 102. A NIC in the server 103 is configured to connect to the network 120.

At step 402, an authentication edge policy is performed. The switch 130 receives a credential from the server 103. The credential may be a MAC address for the NIC in the server 103 or a token or another credential that can be used to uniquely identify the NIC.

At step 403, the switch 130 sends a request to the connection manager 111, including the credential received at step 402, to authenticate the NIC. The credential was previously stored at the connection inventory 110 when the connection profile was assigned to the source, e.g., the NIC for the server 103.

At step 404, the connection manager 111 determines whether the source is an authorized network device that is authorized to connect to the network 120 using the received credential. The connection manager 111 may compare the received credential with the credential previously stored when the connection profile was assigned to the source. If the credentials match, then the source is authorized. In one embodiment, the connection manager 111 uses a RADIUS server to authenticate the source with the received credentials.

If the source is an authorized network device, at step 405, the connection manager 111 determines the network attributes for the source from the assigned connection profile for the source. The network attributes include the VLAN for the source, ACL, QoS, and rate-limit.

At step 406, the connection manager 111 sends the network attributes to the switch 130 so the switch 130 can be configured with the network attributes. This includes the switch 130 determining the VLAN for the source.

At step 407, the connection manager 111 sends the server attributes to the switch 130 for the source. The server attributes include, for example, the IP address, default gateway, subnet mask, domain name server.

At step 408, the server attributes are sent from the switch 130 to the source.

At step 409, the source is configured with the server attributes and is now able to send and receive traffic to and from the network 120 via the switch 130.

At step 410, if the connection manager 111 determines the source is not an authorized network device at step 404, the connection manager 111 sends a notification that the source is not authorized. The notification is sent to the switch 130 and may be sent to the server 103 and the server administrator 102.

Figure 5:
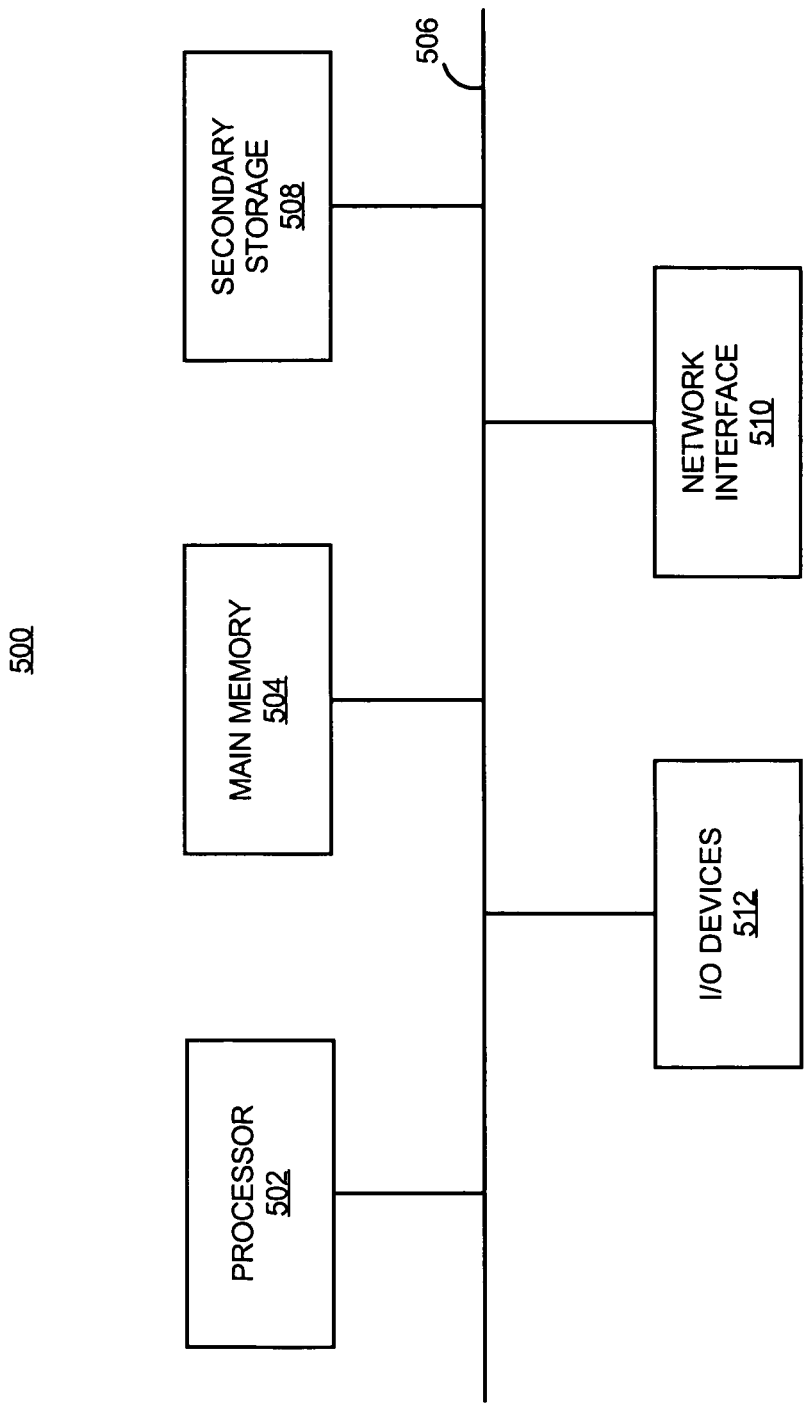
FIG. 5 illustrates a computer system that may be used a platform for the systems and methods of the embodiments.

FIG. 5 illustrates a block diagram of a general purpose computer system 500 that is operable to be used to execute one or more computer programs implementing the embodiments described herein, including steps described herein. The computer system 500 may be used as a platform for the connection inventory 110. It will be apparent to one of ordinary skill in the art that a more sophisticated computer system is operable to be used. Furthermore, components can be added or removed from the computer system 500 to provide the desired functionality.

The computer system 500 includes one or more processors, such as processor 502, providing an execution platform for executing software. Commands and data from the processor 502 are communicated over a communication bus 506. The computer system 500 also includes computer readable storage mediums including a main memory 505, such as a Random Access Memory (RAM), where software is resident during runtime, and a secondary storage 508. The secondary storage 508 includes, for example, a hard disk drive and/or a removable storage drive representing a floppy diskette drive, a magnetic tape drive, a compact disk drive, etc., or a nonvolatile memory where a copy of the software is stored. In one example, the secondary storage 508 also includes ROM (read only memory), EPROM (erasable, programmable ROM), EEPROM (electrically erasable, programmable ROM). The computer system 500 includes one or more input/output (I/O) devices 512, such as a display, keyboard, a mouse, a stylus, and the like. A network interface 510, wired and/or wireless, is provided for communicating with other computer systems.

One or more of the steps of the methods described herein and other steps described herein and one or more of the components of the systems described herein may be implemented as software code stored on a computer readable medium, such as the memory and/or secondary storage, and executed on a computer system, for example, by a processor. For example, the steps of the embodiments may exist as software program(s) comprised of program instructions in source code, object code, executable code or other formats for performing some of the steps. Any of the above may be embodied on a computer readable medium, which include storage devices. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes.

While the embodiments have been described with reference to examples, those skilled in the art will be able to make various modifications to the described embodiments without departing from the scope of the claimed embodiments.

What is claimed is:

1. A non-transitory computer readable medium including code that when executed by a computer system performs a method for configuring a network device for a requested connection, the method comprising:

storing connection profiles for connections in a connection database, wherein the connections are connections for network devices to connect to a network, and the connection profiles identify network attributes for the connections and each connection profile includes a status of one of available and subscribed;

assigning a stored connection profile a status of available indicating that the connection for the connection profile is available to be assigned to one of a plurality of network devices;

changing the status of the assigned connection profile from available to subscribed, wherein the status of subscribed indicates that the connection profile is reserved for the network device to be connected to the network and prevented from being assigned to another network device while the assigned connection profile is not being used by the network device;

receiving a credential for the network device from an edge switch; and authenticating the network device as a network device authorized to use the requested connection to connect to the network, wherein the authenticating is performed using the received credential and information determined for the network device in response to the network device being assigned to the connection profile.

2. The computer readable medium of claim 1, wherein the method further comprises:

in response to the network device being authenticated as a network device authorized to use the requested connection to connect to the network, determining network attributes from the assigned connection profile and sending the network attributes to the edge switch.

3. The computer readable medium of claim 2, wherein the network attributes comprise a virtual local area network (VLAN) for the connection, an access control list identifying authorized traffic allowed on the connection, a quality of service (QoS) for the connection, and rate-limiting for the connection.

4. The computer readable medium of claim 2, wherein the method further comprises:

determining server attributes for the network device from the assigned connection profile and sending the server attributes to the network device via the edge switch.

5. The computer readable medium of claim 4, wherein the server attributes comprise IP address, default gateway, subnet mask, and domain name server.

6. The computer readable medium of claim 1, wherein assigning a stored connection profile to a requested connection for a network device comprises:

if a stored connection profile is available and matches the request, assigning the stored connection profile to the requested connection.

7. The computer readable medium of claim 6, further comprising:
matching network attributes for the requested connection to the network attributes in the stored connection profiles that are available to determine if a matching connection profile exists.

8. The computer readable medium of claim 6, wherein each connection profile includes a hierarchy of information including a pod and a connection class in the pod, and the pod identifies a set of network devices and the connection class identifies network attributes for the connection, the network attributes including a virtual local area network (VLAN) for the connection, an access control list identifying authorized traffic on the connection, a quality of service (QoS) for the connection, and rate-limiting for the connection.

9. The computer readable medium of claim 8, wherein assigning a stored connection profile to a requested connection for a network device comprises:
identifying a connection class for the request; and
matching the connection class for the request to the stored connection profiles that are available and are in the same connection class as the request to determine if a matching connection profile exists.

10. A computer system comprising:
a connection database storing connection profiles for connections, wherein the connections are connections for network devices to connect to a network, and the connection profiles include network attributes for the connections and each connection profile includes a status of one of available and subscribed;
a connection manager to assign a connection profile to a requested connection for a network device, the connection profile having a status of available indicating that the connection for the connection profile is available to be assigned to one of a plurality of the network devices;
change the status of the assigned connection profile from available to subscribed, wherein the status of subscribed indicates that the connection profile is reserved for the network device to be connected to the network and prevented from being assigned to another network device while the assigned connection profile is not being used by the network device;
receive a credential for the network device from an edge switch; and
authenticate the network device as a network device authorized to use the requested connection to connect to the network, wherein the authentication is performed using the received credential and information determined for the network device in response to the network device being assigned to the connection profile; and
a processor to implement the connection manager.

11. The computer system of claim 10, wherein in response to the network device being authenticated as a network device authorized to use the requested connection to connect to the network, the connection manager determines network attributes from the assigned connection profile and sends the network attributes to the edge switch.

12. The computer system of claim 11, wherein the network attributes comprise a virtual local area network (VLAN) for the connection, an access control list identifying authorized traffic allowed on the connection, a quality of service (QoS) for the connection, and rate-limiting for the connection.

13. The computer system of claim 11, wherein the connection manager further:
determines server attributes for the network device from the assigned connection profile and sends the server attributes to the network device via the edge switch, wherein the server attributes include IP address, default gateway, subnet mask, and domain name server.

14. A computer system comprising:
a connection database storing connection profiles for connections,
wherein the connections are connections for network devices to connect to a network,
each connection profile including a status of available indicating that the connection for the connection profile is available for use by one of a plurality of network devices or a status of subscribed indicating that the connection for the connection profile is reserved and unavailable, and
a connection manager to
assign a connection profile having a status of available stored in the connection database to a requested connection for a network device;
change the status of the assigned connection profile from available to subscribed, wherein the status of subscribed indicates that the connection profile is reserved for the network device to be connected to the network and prevented from being assigned to another network device while the assigned connection profile is not being used by the network device;
receive a credential for the network device from an edge switch;
authenticate the network device as a network device authorized to use the requested connection to connect to the network, wherein the authentication is performed using the received credential and information determined for the network device in response to the network device being assigned to the connection profile;
determine server attributes for the network device from the assigned connection profile; and
send the server attributes to the network device; and
a processor to implement the connection manager.

* * * * *